United States Patent
Suram et al.

(10) Patent No.: US 11,493,475 B2
(45) Date of Patent: Nov. 8, 2022

(54) METHODS AND SYSTEMS FOR MACHINE-LEARNING-ASSISTED DISCOVERY OF DARK ELECTROCATALYSTS AND PHOTO-ELECTROCATALYSTS

(71) Applicants: Toyota Research Institute, Inc., Los Altos, CA (US); California Institute of Technology, Pasadena, CA (US)

(72) Inventors: Santosh Suram, Mountain View, CA (US); John M. Gregoire, Sierra Madre, CA (US); Brian Rohr, Menlo Park, CA (US); Helge Stein, Pasadena, CA (US)

(73) Assignees: Toyota Research Institute, Inc., Los Altos, CA (US); California Institute of Technology, Pasadena, CA (US)

( * ) Notice: Subject to any disclaimer, the term of this patent is extended or adjusted under 35 U.S.C. 154(b) by 483 days.

(21) Appl. No.: 16/704,452

(22) Filed: Dec. 5, 2019

(65) Prior Publication Data

US 2020/0340941 A1    Oct. 29, 2020

Related U.S. Application Data

(60) Provisional application No. 62/837,379, filed on Apr. 23, 2019.

(51) Int. Cl.
*G01N 27/413* (2006.01)
*G06K 9/62* (2022.01)
(Continued)

(52) U.S. Cl.
CPC ......... *G01N 27/413* (2013.01); *G05B 13/028* (2013.01); *G05B 13/048* (2013.01); *G06K 9/6256* (2013.01); *G06N 20/00* (2019.01)

(58) Field of Classification Search
CPC .................................................. G01N 27/413
See application file for complete search history.

(56) References Cited

U.S. PATENT DOCUMENTS 9,645,109 B2    5/2017   Jin et al.
2020/0319155 A1*  10/2020  Pratt ................. G01N 27/4045
2020/0340941 A1*  10/2020  Suram ................. G06K 9/6256

OTHER PUBLICATIONS

Belkin et al., Laplacian Eigenmaps for Dimensionality Reduction and Data Representation, Neural Comp., 15, pp. 1373-1396 (2003).

(Continued)

*Primary Examiner* — Michael A Berns
(74) *Attorney, Agent, or Firm* — Christopher G. Darrow; Darrow Mustafa PC

(57) ABSTRACT

Methods and systems described herein concern machine-learning-assisted materials discovery. One embodiment selects a candidate sample set including a plurality of compositions and performs the following operations iteratively: (1) selects an acquisition sample set, (2) performs a dark electrocatalyst experiment or a photo-electrocatalyst experiment on the compositions in the acquisition sample set to determine one or more properties, (3) trains a machine learning model using the one or more properties, and (4) predicts, based at least in part on one or more outputs of the machine learning model, the one or more properties for one or more compositions in a test sample set including compositions on which an experiment has not yet been performed. When one or more predetermined termination criteria have been satisfied, the embodiment also identifies one or more compositions in the candidate sample set for which the one or more properties satisfy predetermined performance criteria.

20 Claims, 3 Drawing Sheets

(51) Int. Cl.
  *G06N 20/00*   (2019.01)
  *G05B 13/04*   (2006.01)
  *G05B 13/02*   (2006.01)

(56) References Cited

OTHER PUBLICATIONS

Bengio et al., Representation Learning: A Review and New Perspectives, IEEE Trans. Software Eng., 35, pp. 1798-1828(2013).

Gregoire et al., Scanning droplet cell for high throughput electrochemical and photoelectrochemical measurements, Rev Sci Instrum. Feb. 2013; 84(2):024102. doi: 10 1063/1.4790419.

Nikolaev et al., Autonomy in materials research: a case study in carbon nanotube growth, npj Computational Materials (2016)2, 16031; doi:10.1038/npjcompumats.2016.31; published online Oct. 21, 2016.

Liu et al., Materials discovery and design using machine learning, J Materiomics 3 (2017) 159e177.

\* cited by examiner

METHODS AND SYSTEMS FOR MACHINE-LEARNING-ASSISTED DISCOVERY OF DARK ELECTROCATALYSTS AND PHOTO-ELECTROCATALYSTS

CROSS-REFERENCE TO RELATED APPLICATION

This application claims the benefit of U.S. Provisional Patent Application No. 62/837,379, "Active Learning Enabled Experimental Materials Discovery," filed Apr. 23, 2019, which is incorporated by reference herein in its entirety.

TECHNICAL FIELD

The subject matter described herein relates in general to materials discovery and, more specifically, to methods and systems for machine-learning-assisted discovery of dark electrocatalysts and photo-electrocatalysts.

BACKGROUND

Discovering new materials having properties that make them suitable for particular applications can be a long and tedious process. Many materials are still found empirically: candidates are made and tested a few samples at a time. Searches are sometimes subject to human bias, and researchers often focus on a few combinations of the elements that they deem interesting.

Machine learning techniques—algorithms trained to identify patterns in data sets—have the potential to speed up the discovery new materials. Though some success has been achieved using such techniques, challenges remain. For example, there is no universal representation for encoding materials. Different applications require different properties, such as elemental composition, crystal structure, and conductivity. Well-curated experimental data on materials are rare, and computational tests of hypotheses rely on assumptions and models that may be far from realistic under experimental conditions.

SUMMARY

An example of a system for machine-learning-assisted materials discovery is presented herein. The system comprises a candidate sample set that includes a plurality of compositions, an experimental apparatus, one or more processors, and a memory communicatively coupled to the one or more processors. The memory stores an acquisition module including instructions that when executed by the one or more processors cause the one or more processors, during each of one or more iterations, to select an acquisition sample set by applying an acquisition function to a test sample set, the test sample set including compositions in the candidate sample set for which an experiment has yet to be performed. The memory also stores an experimentation module including instructions that when executed by the one or more processors cause the one or more processors, during each of the one or more iterations, to control the experimental apparatus to perform the experiment on the compositions in the acquisition sample set to determine one or more properties of the compositions in the acquisition sample set, wherein the experiment is one of a dark electrocatalyst experiment and a photo-electrocatalyst experiment. The memory also stores a machine learning module including instructions that when executed by the one or more processors cause the one or more processors, during each of the one or more iterations, to train a machine learning model using the one or more properties of the compositions in the acquisition sample set and predict, based at least in part on one or more outputs of the machine learning model, the one or more properties for one or more compositions in the test sample set. The memory also stores an output module including instructions that when executed by the one or more processors cause the one or more processors, when one or more predetermined termination criteria concluding the one or more iterations have been satisfied, to identify one or more compositions in the candidate sample set for which the one or more properties satisfy predetermined performance criteria.

Another embodiment is a non-transitory computer-readable medium for machine-learning-assisted materials discovery and storing instructions that when executed by one or more processors cause the one or more processors to select a candidate sample set that includes a plurality of compositions. The instructions also cause the one or more processors to perform the following during one or more iterations until one or more predetermined termination criteria are satisfied: (1) select an acquisition sample set by applying an acquisition function to a test sample set, the test sample set including compositions in the candidate sample set for which an experiment has yet to be performed; (2) perform the experiment on the compositions in the acquisition sample set to determine one or more properties of the compositions in the acquisition sample set, wherein the experiment is one of a dark electrocatalyst experiment and a photo-electrocatalyst experiment; (3) train a machine learning model using the one or more properties of the compositions in the acquisition sample set; and (4) predict, based at least in part on one or more outputs of the machine learning model, the one or more properties for one or more compositions in the test sample set. The instructions also cause the one or more processors to identify one or more compositions in the candidate sample set for which the one or more properties satisfy predetermined performance criteria, when the one or more predetermined termination criteria have been satisfied.

Another embodiment is a method of machine-learning-assisted materials discovery. The method comprises selecting a candidate sample set that includes a plurality of compositions. The method also includes performing the following during one or more iterations until one or more predetermined termination criteria are satisfied: (1) selecting an acquisition sample set by applying an acquisition function to a test sample set, the test sample set including compositions in the candidate sample set for which an experiment has yet to be performed; (2) performing the experiment on the compositions in the acquisition sample set to determine one or more properties of the compositions in the acquisition sample set, wherein the experiment is one of a dark electrocatalyst experiment and a photo-electrocatalyst experiment; (3) training a machine learning model using the one or more properties of the compositions in the acquisition sample set; and (4) predicting, based at least in part on one or more outputs of the machine learning model, the one or more properties for one or more compositions in the test sample set. The method also includes identifying one or more compositions in the candidate sample set for which the one or more properties satisfy predetermined performance criteria, when the one or more predetermined termination criteria have been satisfied.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Machine learning has been applied to simulated datasets to accelerate identification of candidate materials for specific applications such as flow batteries, organic light-emitting diodes, organic photovoltaic cells, and carbon dioxide conversion catalysts. These algorithms typically result in orders-of-magnitude increase in the rate of simulated materials discovery. The embodiments described herein couple an iterative machine-learning-based architecture with high-throughput experimental dark electrocatalyst and photo-electrocatalyst screening techniques to accelerate the discovery of electrocatalysts used in energy applications. In one embodiment, the techniques described herein are applied to the discovery of electrocatalysts for fuel cells used in electric and hybrid vehicles, both terrestrial and aquatic. In another embodiment, the techniques described herein are applied to the discovery of electrocatalysts for solar fuels applications in which solar energy is converted to fuel.

In various embodiments, a candidate sample set is selected that includes a plurality of compositions. A dark electrocatalyst or photo-electrocatalyst experiment is performed on a subset of the compositions in the candidate sample set, and the resulting one or more experimental properties are input to a machine-learning algorithm that predicts the outcome (i.e., the properties) for the remaining samples in the candidate sample set and identifies one or more samples on which to repeat the experiment during the next iteration. When one or more predetermined termination criteria have been satisfied, the iterative experimental and machine-learning process can terminate. At that point, the system can identify one or more compositions in the candidate sample set for which the one or more measured properties satisfy predetermined performance criteria (e.g., a desired level of catalytic current). The approach to materials discovery just described enables one to learn about the entire set of samples in the candidate sample set by studying (experimenting upon) only 10-20 percent of the samples.

Figure 1:
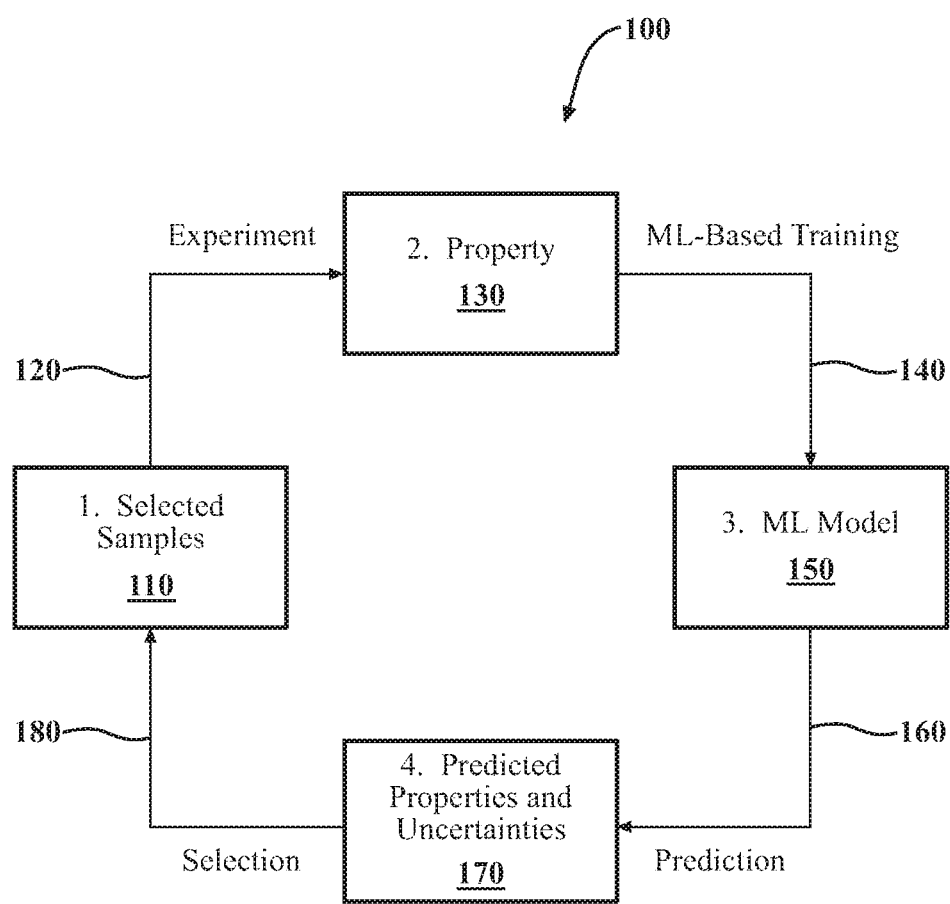
FIG. 1 illustrates an experimental materials discovery architecture, in accordance with an illustrative embodiment of the invention.

Referring to FIG. 1, an embodiment of an experimental materials discovery architecture 100 is illustrated. In FIG. 1, a dark electrocatalyst or photo-electrocatalyst experiment (experiment 120) is performed on selected samples 110 to determine one or more properties (property 130) of the selected samples 110. As those skilled in the art are aware, a "dark electrocatalyst" experiment involves applying an electrical potential (voltage) to the sample, whereas a "photo-electrocatalyst" experiment involves subjecting the sample to a light-based stimulus. The measured properties of the samples are used to train a machine-learning (ML) model 150 (see ML-based training 140 in FIG. 1). The ML model 150 performs predictions (prediction 160) to yield predicted properties and uncertainties 170 (in other embodiments, only predicted properties are output). Based on the predicted properties and uncertainties 170, samples are selected for the next iteration (selection 180). The operations indicated in FIG. 1 can be performed during one or more iterations (e.g., in a loop) until one or more predetermined termination criteria have been satisfied. The operations indicated in FIG. 1 are elaborated upon below in the context of an algorithm and a system that implements an architecture such as that depicted in FIG. 1.

An illustrative algorithm based on the experimental materials discovery architecture 100 shown in FIG. 1 begins with initialization of a loop at the zeroth iteration (discrete time k=0). This begins with the selection of a candidate sample set {CSS}. In some embodiments, the candidate sample set {CSS} includes a plurality of compositions. For example, a composition might include a specified proportion of the elements iron and oxygen. In one embodiment, the candidate sample set includes materials that can be simultaneously placed on a single xy translational stage of an experimental apparatus. The candidate samples can be derived from uniform or non-uniform discretization of a multi-dimensional sample parameter space. The multi-dimensional sample parameter space could be either a combination of elements or parameters including, but not limited to, temperature, chemical potential of elements, various synthesis methods, etc. The multi-dimensional sample parameter space could also include parameters pertaining to operating conditions for testing electrocatalysts (e.g., using dark electrocatalyst screening techniques or photo-electrocatalyst screening techniques), including, but not limited to, voltage range, electrolyte composition, gas concentration in the electrolyte, additional external stimulus such as photons, and the temperature of the electrolyte.

Another aspect of the algorithm is an acquisition sample set {ASS}, which is initialized, at k=0, through the selection of a subset of the samples in the candidate sample set {CSS}. The selection of the subset can be random, based on the analysis of an expert (e.g., a research scientist), or based on one or more outputs of a ML model (e.g., predictions or both predictions and corresponding uncertainty estimates).

Another aspect of the algorithm is a training sample set {TrSS}, which is initialized, at k=0, as follows: {TrSS}={ASS}.

Another aspect of the algorithm is a test sample set {TSS}, which is initialized, at k=0, as follows: {TSS}={CSS}−{TrSS}. That is, the test sample set includes those samples in the candidate sample set {CSS} on which an experiment has not yet been performed.

In this embodiment, the loop, at each iteration, proceeds as follows:

1. Acquisition Sample Set {ASS}: At iteration k=0 (initialization), ${ASS}_k$ is derived as described above. For k>0, ${ASS}_k$=AcquisitionFunction(${ML\_TSS}_k$). Properties for ${ASS}_k$ are measured experimentally in the kth iteration. ${ML\_TSS}_k$ is the output of the ML model at the kth iteration.
2. Training Sample Set {TrSS}: At iteration k, ${TrSS}_k$={TrSS}$_{k-1}$+${ASS}_k$. Each sample in ${TrSS}_k$ can contain descriptors from the sample parameter space and its corresponding property data.
3. Properties: Properties of samples that are either directly measured or analytically derived from experimental measurements. In some embodiments, at the kth iteration, all samples in $\{TrSS\}_k$ have property values.
4. Test sample Set $\{TSS\}$: $\{TSS\}_k=\{CSS\}-\{TrSS\}_k$. Each sample in $\{TSS\}_k$ can contain descriptors from the sample parameter space. The corresponding properties can be predicted using ML in the kth iteration.
5. ML model: Machine-learning model that can be trained using the properties already measured at the kth iteration of the loop. The model outputs predictions and, in some embodiments, uncertainties for properties of samples in $\{TSS\}_k$.

Figure 2:
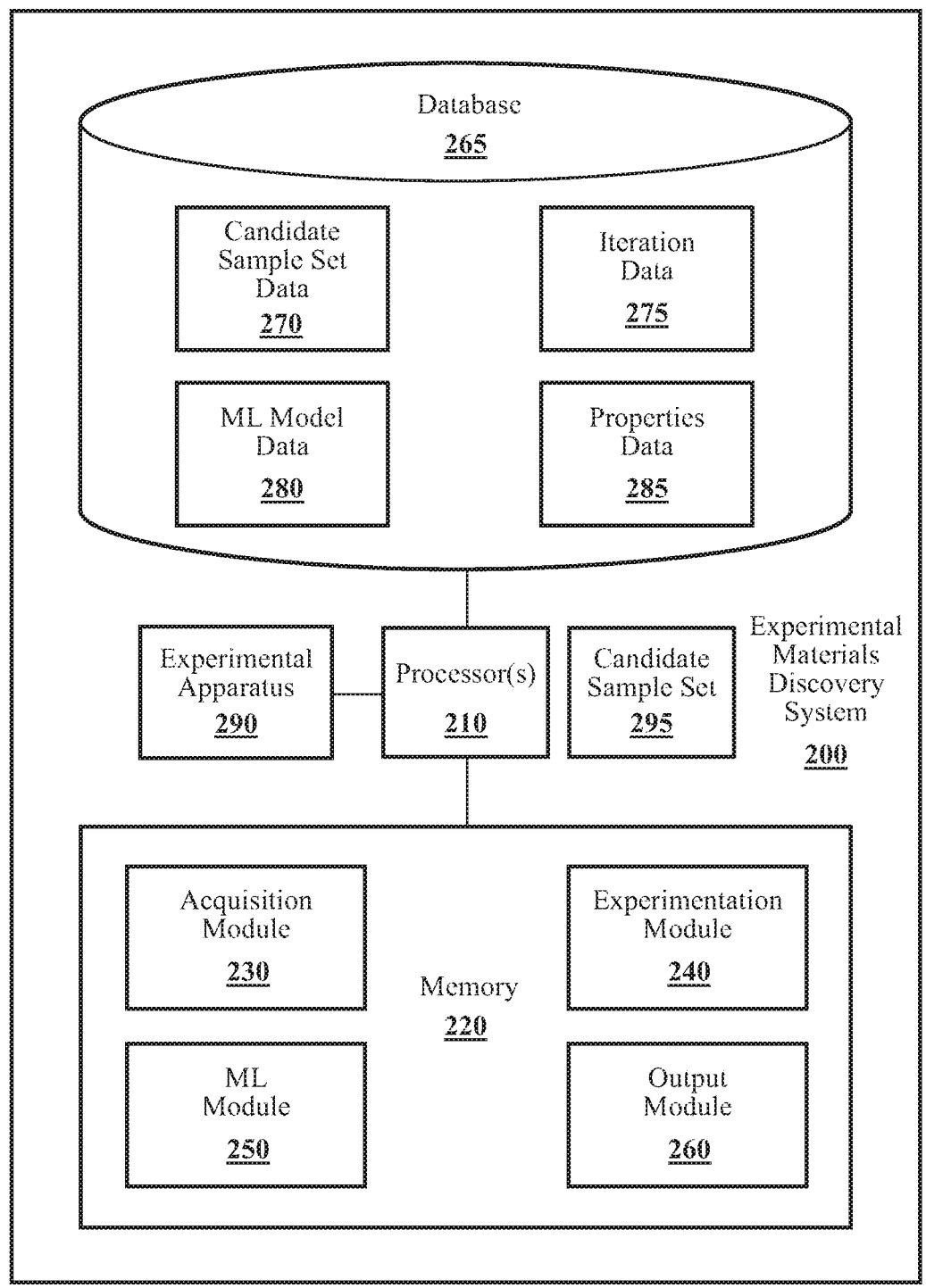
FIG. 2 illustrates one embodiment of an experimental materials discovery system.

With reference to FIG. 2, it illustrates one embodiment of an experimental materials discovery system 200. Depending on the particular embodiment, experimental materials discovery system 200 can include more or fewer elements than depicted in FIG. 2.

Experimental materials discovery system 200 includes one or more processors 210 communicably coupled with a memory 220. In this embodiment, memory 220 stores an acquisition module 230, an experimentation module 240, a ML module 250, and an output module 260. The memory 220 is a random-access memory (RAM), read-only memory (ROM), flash memory, or other suitable memory for storing the modules 230, 240, 250, and 260. The modules 230, 240, 250, and 260 are, for example, computer-readable instructions that when executed by the one or more processors 210 cause the one or more processors 210 to perform the various functions disclosed herein. Experimental materials discovery system 200 also includes candidate sample set 295, which, in some embodiments, includes a plurality of compositions, as discussed above. Experimental materials discovery system 200 can store, in database 265, candidate sample set data 270 corresponding to the physical samples in candidate sample set 295. Experimental materials discovery system 200 can also store, in database 265, iteration data 275—data associated with the various iterations of the algorithm described above (e.g., information regarding the acquisition sample sets and the test sample set).

Acquisition module 230 generally includes instructions that cause the one or more processors 210, during each of one or more iterations, to select an acquisition sample set by applying an acquisition function to a test sample set. As discussed above, the test sample set includes compositions in the candidate sample set for which an experiment has yet to be performed. Depending on the embodiment, the acquisition function, as discussed above, can select the acquisition sample set based on random selection, expert knowledge or analysis, or one or more outputs of the ML model 150. In some embodiments, the acquisition function operates on predictions output by the ML model 150. In other embodiments, the acquisition function operates on both predictions and corresponding uncertainty estimates output by the ML model 150. In one embodiment, the uncertainty estimates are based on Bayesian probability techniques. In some embodiments, the output of the acquisition function is a score for a given sample indicating whether that sample should be included in an experiment during the next iteration.

In some embodiments, an "expected improvement" acquisition function is used. This function simply adds the predicted performance and the uncertainty of the prediction. The point in the search space that maximizes this score is chosen. Mathematically, the acquisition function is $a=\text{argmax }[p+h\cdot u]$, where p is a vector containing the predicted performance of each point in the unexplored portion of the search space, u is a vector of the same length containing the uncertainty corresponding to each prediction, h is a scalar hyperparameter, and a is the catalyst composition in the search space that the acquisition function chooses to acquire.

Experimentation module 240 generally includes instructions that cause the one or more processors 210, during each of the one or more iterations, to control the experimental apparatus 290 to perform an experiment on the compositions in the acquisition sample set to determine one or more properties (e.g., catalytic current) of the compositions in the acquisition sample set. As discussed above, in this embodiment, the experiment is a dark electrocatalyst experiment or a photo-electrocatalyst experiment. One example of an experimental apparatus 290 that can be used, in some embodiments, is that described in U.S. Pat. No. 9,645,109 B2, "Scanning Drop Sensor." As discussed above, in some embodiments, high-throughput experimentation is employed. This means that the experiments are conducted in a fraction of the time normally required—that the experiments are conducted at a relatively rapid rate. High-throughput experimentation increases the efficiency with which experimental materials discovery system 200 operates. In some embodiments, the experiments are performed manually (by human workers) instead of experimentation module 240 automatically controlling experimental apparatus 290. The properties revealed through running the experiment can be stored, in database 265, as properties data 285.

ML module 250 generally includes instructions that cause the one or more processors 210, during each of the one or more iterations, to train ML model 150 using the one or more properties of the compositions in the acquisition sample set obtained from the experiment. In some embodiments, ML model 150 is continually trained as experimental materials discovery system 200 is used. In such an embodiment, ML model 150 never stops learning; the process of training the model is ongoing. ML module 250 also generally includes instructions that cause the one or more processors 210, during each of the one or more iterations, to predict, based at least in part on one or more outputs of ML model 150, one or more properties for one or more compositions in the test sample set. As discussed above, the output of ML model 150 is, in some embodiments, predictions of the one or more properties only. In other embodiments, ML model 150 outputs both predictions of the one or more properties and, for each prediction, a corresponding uncertainty estimate. In an embodiment in which ML model 150 outputs only predictions, uncertainties can be obtained by running the model through a large number of iterations (e.g., 100 predictions) and computing a figure of merit such as the standard deviation of the predictions.

In some embodiments, ML model 150 is a supervised regression model. One example of such a model is a Gaussian process regressor. Another example is a random forest regressor. In general, the ML model 150 includes any computational method that can predict properties and uncertainties of the samples in the test set based on the samples and properties in the training set. ML models include, but are not limited to, neural networks, Bayesian, and ensemble-based approaches. As just mentioned, in some embodiments, the ML model 150 includes a neural network. In some embodiments, the architecture of ML model 150 remains consistent throughout all of the iterations, and ML model 150 learns from previous iterations. In other embodiments, the architecture of ML model 150 during a given iteration is independent of the architecture of ML model 150 during any of the other iterations. ML module 250 can store, in database 265, ML model data 280 (e.g., information regarding the training sample set and other ML-model-related data).

Output module 260 generally includes instructions that cause the one or more processors 210, when one or more predetermined termination criteria concluding the one or more iterations have been satisfied, to identify one or more compositions in the candidate sample set 295 for which the one or more properties satisfy predetermined performance criteria (e.g., a desired level of catalytic current). In one embodiment, the predetermined termination criteria include one or more of the following: (1) an aggregated uncertainty measure of the test sample set decreasing less than a predetermined level over a predetermined number of consecutive iterations (e.g., the average uncertainty in the test dataset does not decrease by more than 5 percent in the last 10 iterations) and (2) the probability that a predetermined percentage of compositions in the candidate sample set 295 satisfy the predetermined performance criteria exceeds a predetermined confidence level (e.g., the probability that the top 5 percent of samples have already been tested is greater than 95 percent).

Figure 3:
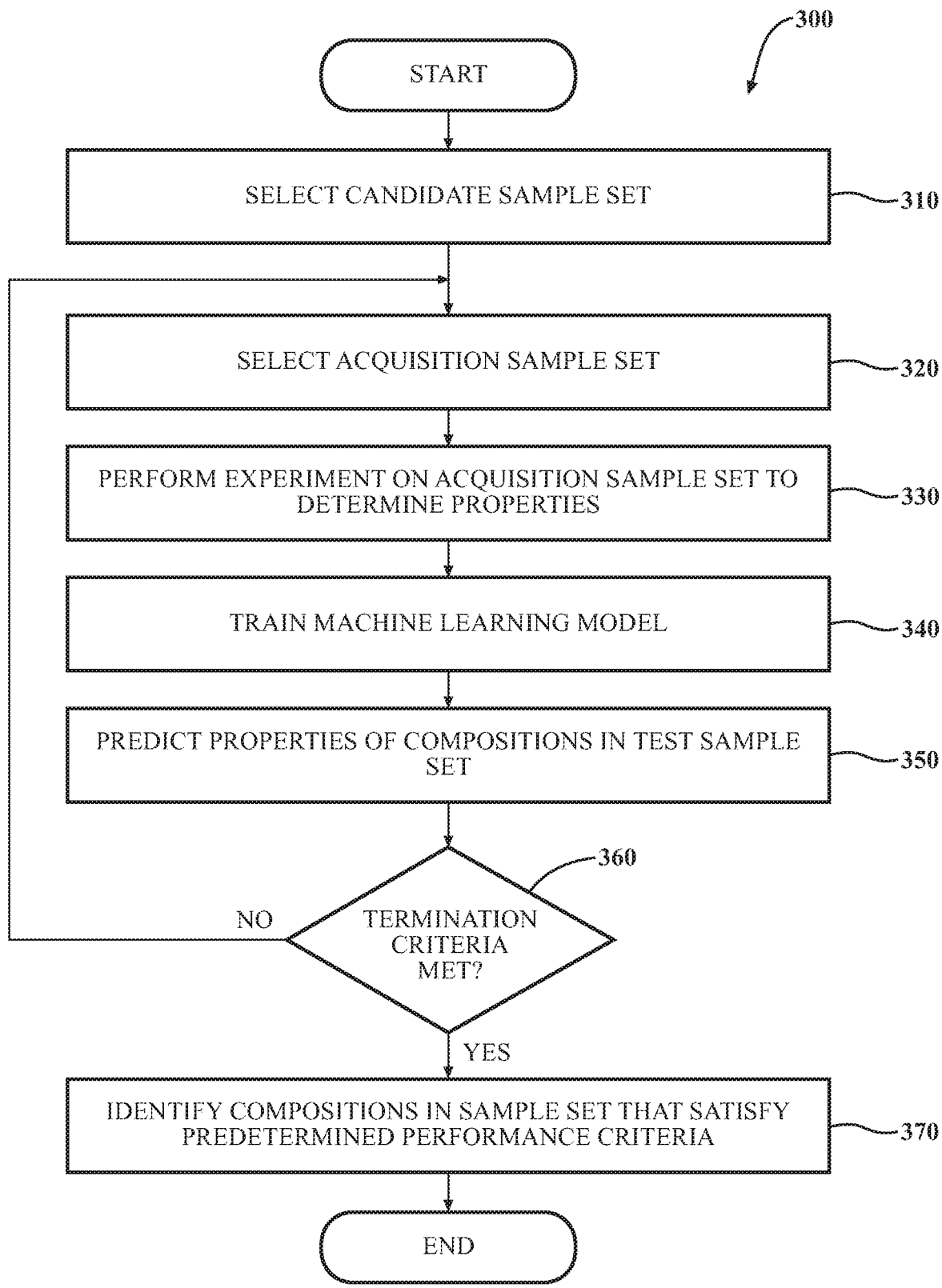
FIG. 3 is a flowchart of a method of machine-learning-assisted materials discovery, in accordance with an illustrative embodiment of the invention.

FIG. 3 is a flowchart of a method 300 of machine-learning-assisted materials discovery, in accordance with an illustrative embodiment of the invention. Method 300 will be discussed from the perspective of experimental materials discovery system 200 in FIG. 2. While method 300 is discussed in combination with experimental materials discovery system 200, it should be appreciated that method 300 is not limited to being implemented using experimental materials discovery system 200, but experimental materials discovery system 200 is instead one example of a system that may implement method 300.

At block 310, a candidate sample set 295 is selected that includes a plurality of compositions, as discussed above. As discussed above, data corresponding to candidate sample set 295 can be stored in database 265 (see candidate sample set data 270 in FIG. 2).

At block 320, acquisition module 230 selects an acquisition sample set by applying an acquisition function to a test sample set. As discussed above, the test sample set includes compositions in the candidate sample set for which an experiment has yet to be performed. As also discussed above, the selection of the subset via the acquisition function can be based on random selection, the analysis of an expert, or one or more outputs of a ML model (e.g., predictions or both predictions and uncertainty estimates). A specific example of an acquisition function (an "expected improvement" acquisition function) is also discussed above.

At block 330, experimentation module 240 controls experimental apparatus 290 to perform the experiment on the compositions in the acquisition sample set to determine one or more properties of the compositions in the acquisition sample set. As discussed above, depending on the embodiment, the experiment can be a dark electrocatalyst experiment or a photo-electrocatalyst experiment.

At block 340, ML module 250 causes the one or more processors 210 to train a ML model 150 using the one or more properties of the compositions in the acquisition sample set determined, during the current iteration, by performing the experiment. As discussed above, the ML model 150, in some embodiments, is a supervised regression model (e.g., a Gaussian process regressor or a random forest regressor).

At block 350, ML module 250 predicts, based at least in part on one or more outputs of ML model 150, one or more properties for one or more compositions in the test sample set. As discussed above, this influences which samples in the test sample set are selected as the acquisition sample set during the next iteration of the loop (blocks 320, 330, 340, and 350).

At block 360, if one or more predetermined termination criteria have been met, control proceeds to block 370, where output module 260 identifies one or more compositions in the candidate sample set for which the one or more properties satisfy predetermined performance criteria (e.g., catalytic current). Otherwise, if the one or more predetermined termination criteria have not been met, control returns to block 320 for the commencement of another iteration through the loop (blocks 320, 330, 340, and 350).

The integration of active-learning techniques with electrochemical experiments described herein provides some important advantages. First, such integration can lead to a throughput increase in the investigation of electrocatalysts of as much as an order of magnitude or more. Second, such integration supports searching a significantly larger (potentially greater than an order of magnitude) chemical and parameter space within a practical timescale. Third, such integration can be fully automated to create an autonomous experimental catalyst discovery platform. Fourth, such integration can generate benchmarked models that are applicable for larger chemical and parameter spaces. In a practical demonstration of the techniques described herein, it has been shown that 70-100 percent of the top 2.5 percent of catalysts can be identified after searching through less than 10 percent of the search space. In some materials-discovery settings, the machine-learning techniques described herein can accelerate research by up to a factor of 20 relative to random acquisition.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A system for machine-learning-assisted materials discovery, the system comprising:
    a candidate sample set that includes a plurality of compositions;
    an experimental apparatus;
    one or more processors; and
    a memory communicably coupled to the one or more processors and storing:
    an acquisition module including instructions that when executed by the one or more processors cause the one or more processors, during each of one or more iterations, to select an acquisition sample set that includes one or more compositions in the candidate sample set by applying an acquisition function to a test sample set, the test sample set including compositions in the candidate sample set for which an experiment has yet to be performed;
    an experimentation module including instructions that when executed by the one or more processors cause the one or more processors, during each of the one or more iterations, to control the experimental apparatus to perform the experiment on the one or more compositions in the acquisition sample set to determine one or more properties of the one or more compositions in the acquisition sample set, wherein the experiment is one of a dark electrocatalyst experiment and a photo-electrocatalyst experiment;
    a machine learning module including instructions that when executed by the one or more processors cause the one or more processors, during each of the one or more iterations, to:
        train a machine learning model using the one or more properties of the one or more compositions in the acquisition sample set; and predict, based at least in part on one or more outputs of the machine learning model, the one or more properties for one or more compositions in the test sample set; and an output module including instructions that when executed by the one or more processors cause the one or more processors, when one or more predetermined termination criteria concluding the one or more iterations have been satisfied, to identify one or more compositions in the candidate sample set for which the one or more properties satisfy predetermined performance criteria.

2. The system of claim 1, wherein the instructions in the acquisition module to select the acquisition sample set by applying the acquisition function to the test sample set include instructions to select the acquisition sample set based on one of random selection, expert analysis, and the one or more outputs of the machine learning model.

3. The system of claim 1, wherein a parameter space of the experiment includes one or more of a combination of elements, temperature, chemical potential of elements, one or more synthesis methods, voltage range, electrolyte composition, electrolyte gas concentration, electrolyte temperature, and external photon stimulus.

4. The system of claim 1, wherein the one or more properties include catalytic current.

5. The system of claim 1, wherein the one or more outputs of the machine learning model include, for each of the one or more compositions in the test sample set, a prediction of the one or more properties and, for each prediction, a corresponding uncertainty estimate.

6. The system of claim 1, wherein the machine learning model is one of a Gaussian process regressor and a random forest regressor.

7. The system of claim 1, wherein, during each of the one or more iterations, an architecture of the machine learning model is independent of the architecture of the machine learning model during any other iteration.

8. The system of claim 1, wherein, during each of the one or more iterations, an architecture of the machine learning model remains consistent and the machine learning model learns from previous iterations.

9. The system of claim 1, wherein the predetermined termination criteria include at least one of (a) an aggregated uncertainty measure of the test sample set decreasing less than a predetermined level over a predetermined number of consecutive iterations and (b) a probability that a predetermined percentage of compositions in the candidate sample set satisfy the predetermined performance criteria exceeds a predetermined confidence level.

10. A non-transitory computer-readable medium for machine-learning-assisted materials discovery and storing instructions that when executed by one or more processors cause the one or more processors to:

select a candidate sample set that includes a plurality of compositions;

perform the following during one or more iterations until one or more predetermined termination criteria are satisfied:

select an acquisition sample set that includes one or more compositions in the candidate sample set by applying an acquisition function to a test sample set, the test sample set including compositions in the candidate sample set for which an experiment has yet to be performed;

perform the experiment on the one or more compositions in the acquisition sample set to determine one or more properties of the one or more compositions in the acquisition sample set, wherein the experiment is one of a dark electrocatalyst experiment and a photo-electrocatalyst experiment;

train a machine learning model using the one or more properties of the one or more compositions in the acquisition sample set; and predict, based at least in part on one or more outputs of the machine learning model, the one or more properties for one or more compositions in the test sample set; and identify one or more compositions in the candidate sample set for which the one or more properties satisfy predetermined performance criteria, when the one or more predetermined termination criteria have been satisfied.

11. The non-transitory computer-readable medium of claim 10, wherein the instructions to select the acquisition sample set by applying the acquisition function to the test sample set include instructions to select the acquisition sample set based on one of random selection, expert analysis, and the one or more outputs of the machine learning model.

12. A method of machine-learning-assisted materials discovery, the method comprising:

selecting a candidate sample set that includes a plurality of compositions;

performing the following during one or more iterations until one or more predetermined termination criteria are satisfied:

selecting an acquisition sample set that includes one or more compositions in the candidate sample set by applying an acquisition function to a test sample set, the test sample set including compositions in the candidate sample set for which an experiment has yet to be performed;

performing the experiment on the one or more compositions in the acquisition sample set to determine one or more properties of the one or more compositions in the acquisition sample set, wherein the experiment is one of a dark electrocatalyst experiment and a photo-electrocatalyst experiment;

training a machine learning model using the one or more properties of the one or more compositions in the acquisition sample set; and predicting, based at least in part on one or more outputs of the machine learning model, the one or more properties for one or more compositions in the test sample set; and identifying one or more compositions in the candidate sample set for which the one or more properties satisfy predetermined performance criteria, when the one or more predetermined termination criteria have been satisfied.

13. The method of claim 12, wherein the acquisition function selects the acquisition sample set based on one of random selection, expert analysis, and the one or more outputs of the machine learning model.

14. The method of claim 12, wherein a parameter space of the experiment includes one or more of a combination of elements, temperature, chemical potential of elements, one or more synthesis methods, voltage range, electrolyte composition, electrolyte gas concentration, electrolyte temperature, and external photon stimulus.

15. The method of claim 12, wherein the one or more properties include catalytic current.

16. The method of claim 12, wherein the one or more outputs of the machine learning model include, for each of the one or more compositions in the test sample set, a prediction of the one or more properties and, for each prediction, a corresponding uncertainty estimate.

17. The method of claim 12, wherein the machine learning model is one of a Gaussian process regressor and a random forest regressor.

18. The method of claim 12, wherein, during each of the one or more iterations, an architecture of the machine learning model is independent of the architecture of the machine learning model during any other iteration.

19. The method of claim 12, wherein, during each of the one or more iterations, an architecture of the machine learning model remains consistent and the machine learning model learns from previous iterations.

20. The method of claim 12, wherein the predetermined termination criteria include at least one of (a) an aggregated uncertainty measure of the test sample set decreasing less than a predetermined level over a predetermined number of consecutive iterations and (b) a probability that a predetermined percentage of compositions in the candidate sample set satisfy the predetermined performance criteria exceeds a predetermined confidence level.

\* \* \* \* \*